US005618102A

United States Patent [19]

Ferrell

[11] Patent Number: 5,618,102

[45] Date of Patent: Apr. 8, 1997

[54] PLASMA DISCHARGE LAMP

[75] Inventor: Richard M. Ferrell, Livonia, Mich.

[73] Assignee: ADAC Plastics, Inc., Grand Rapids, Mich.

[21] Appl. No.: 475,225

[22] Filed: Jun. 7, 1995

[51] Int. Cl.$^6$ .................................................. B60Q 1/04

[52] U.S. Cl. ........................... 362/303; 362/61; 362/263; 362/298

[58] Field of Search .............................. 362/61, 298, 302, 362/303, 304, 305, 346, 310, 307, 308, 299, 300, 263, 265, 80

[56] References Cited

U.S. PATENT DOCUMENTS

| | | | |
|---|---|---|---|
| 1,577,352 | 3/1926 | Caughlan | 362/303 |
| 1,633,838 | 6/1927 | Zimmerman . | |
| 1,640,448 | 8/1927 | Halvorson, Jr. | 362/303 |
| 1,675,731 | 7/1928 | Schofield . | |
| 1,703,494 | 2/1929 | Lewis . | |
| 1,775,619 | 9/1930 | Whalen | 362/61 |
| 1,883,360 | 10/1932 | Fortney | 362/61 |
| 2,198,014 | 4/1940 | Ott | 362/303 |
| 3,749,906 | 7/1973 | Thiry . | |
| 4,224,551 | 9/1980 | Liebegott . | |
| 4,587,601 | 5/1986 | Collins | 362/303 X |
| 4,654,758 | 3/1987 | Szekacs . | |
| 4,731,713 | 3/1988 | Perthus . | |
| 4,760,498 | 7/1988 | Lang et al. | 362/302 X |
| 4,879,636 | 11/1989 | Yamagishi et al. | 362/263 |
| 4,953,063 | 8/1990 | Nino . | |
| 5,014,166 | 5/1991 | Draper et al. . | |
| 5,117,312 | 5/1992 | Dolan | 362/298 X |
| 5,278,731 | 1/1994 | Davenport et al. . | |

*Primary Examiner*—Ira S. Lazarus
*Assistant Examiner*—Thomas M. Sember
*Attorney, Agent, or Firm*—Young & Basile, P.C.

[57] ABSTRACT

A lamp especially designed for use with plasma discharge light sources such as neon tubes. The lamp provides secondary reflective surfaces to ensure that each ray of light leaving the neon tube strikes at least one metallic reflective surface so as to reduce the troublesome RF characteristic of the neon tube and reduce the interference with other electronic equipment on board the vehicle.

14 Claims, 2 Drawing Sheets

PLASMA DISCHARGE LAMP

BACKGROUND OF THE INVENTION

This invention relates to plasma discharge lamps and more particularly to neon lamps.

There is increasing interest in the usage of plasma discharge lamps, and in particular neon lamps, for automotive applications such as head lamps since the plasma discharge lamps reach full illumination faster than incandescent lamps and provide styling possibilities not available with incandescent lighting. However, plasma discharge lamps, and in particular neon tube lamps, act as antennas which broadcast radio frequency emissions. These emissions can interfere with the operation of electronic equipment on board an automobile such as a radio, an antilock brake system or a computer.

SUMMARY OF THE INVENTION

The invention relates to a lamp of the type including a reflector defining a reflective surface having a focal point; a cover coacting with the reflector to define a lamp chamber; and a plasma discharge light source positioned in the chamber at the focal point. According to the invention, a deflector device is located in the chamber between the light source and the cover in a position to intersect and redirect light rays emanating from the light source prior to passage of the light rays through the cover. This arrangement recognizes the fact that metallic reflective surfaces absorb radio frequency waves and, in accordance with this recognition, causes each light ray from the light source to reflect off at least one and preferably more than one metallic surface before passing through the cover so as to reduce the RF characteristics of the light rays and thereby reduce the interference with other electronic equipment on board an associated vehicle.

According to one embodiment of the invention, the reflector has an elliptic configuration defining first and second focal points; the light source is positioned at the first focal point; the deflector device presents a parabolic reflective surface; and the second focal point of the reflector constitutes the focus of the parabolic surface. This arrangement allows all of the light rays from the light source to pass through the second focal point for delivery to the parabolic surface where they are collimated so as to pass out of the cover of the lamp as a concentrated beam such, for example, as the headlight beam of a motor vehicle.

In a second embodiment of the invention, the deflector device is positioned between the first and second focal points of the elliptic reflector surface and presents a parabolic surface having a convexity facing the first focal point. With this arrangement rays from the light source reflect off of the parabolic surface of the deflector device, thereafter reflect off of the elliptic surface of the reflector, thereafter pass through the second focal point of the elliptic surface, and thereafter pass through a lens where they are collimated to define a beam.

The invention also proposed a method of reducing the RF characteristics of a plasma discharge light source by placing a deflector device in the lamp chamber between the light source and the cover of the lamp in a position to intercept and redirect light rays emanating from the light source prior to passage of the light rays through the cover. This methodology causes each light ray emitting from the light source to reflect off at least one and preferably more than one metallic surface before passing through the lens whereby to absorb radio frequency and reduce the interference with other electronic equipment on board an associated vehicle.

DETAILED DESCRIPTION OF PREFERRED EMBODIMENTS

Figure 1:
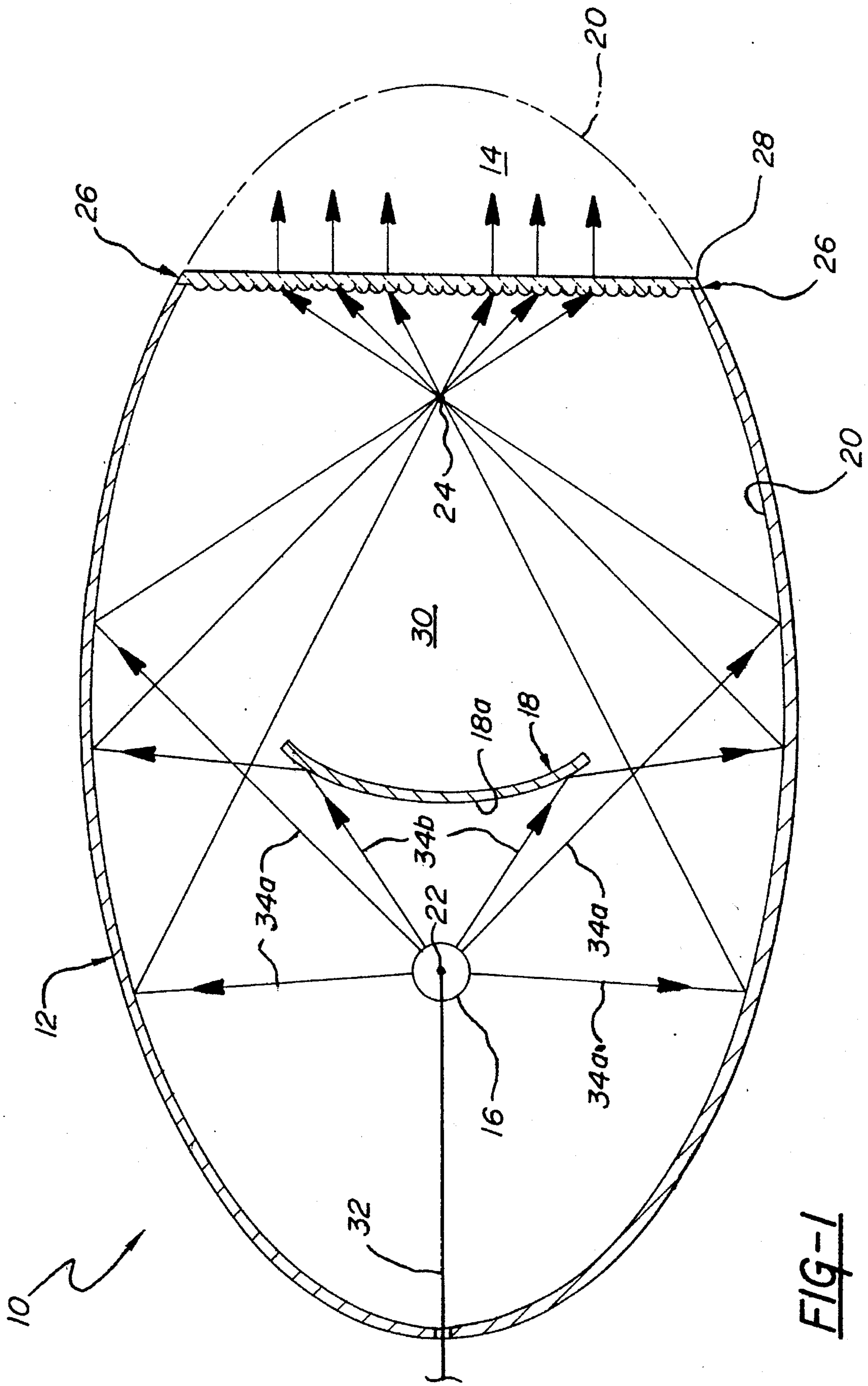
FIG. 1 is a schematic cross-sectional view of a lamp according to the invention.

The lamp seen in FIG. 1, broadly considered, includes a reflector housing 12, a lens 14, a light source 16, and a deflector 18.

Reflector housing 12 is formed of any suitable rigid material and defines an inner elliptic reflective surface 20 formed of a suitable reflective metallic material. Elliptic surface 20 includes a first focal point 22 and a second focal point 24 which, in known manner, form the two fixed points about which the elliptic surface is generated.

Lens 14 is of known form and construction and is suitably sealed at 26 at the forward annular edge 28 of the reflector housing so as to coact with the housing to define a sealed chamber 30 within the housing. Lens 14 will be seen to be positioned forwardly of the second focal point 24 of the elliptic surface 20 and will be seen to truncate elliptic surface 20.

Figure 3:
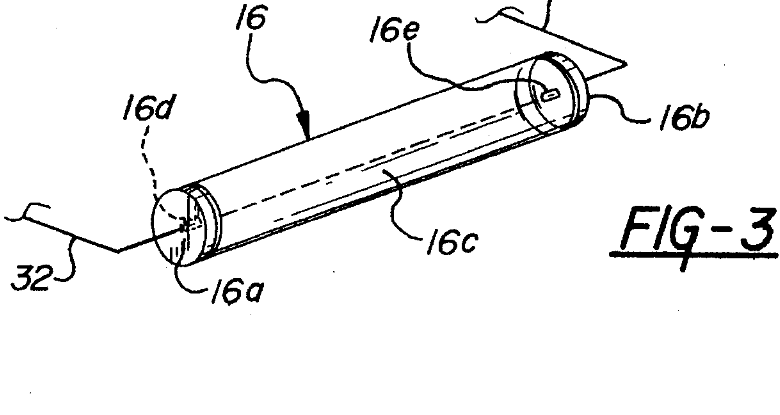
FIG. 3 is a detailed perspective view of a light source for use in the lamp of FIG. 1 or FIG. 2.

Light source 16 is positioned at the first focal point 22 and preferably comprises an elongated neon tube, seen in detail in FIG. 3 extending transversely of a central axis 31 of the reflector and passing through first focal point 22. Leads 32 extend through reflector housing 12 to opposite ends *16a*, *16b* of the tube *16c* of the neon light source where they connect in known manner with the anode *16d* and cathode *16e* of the tube so that a plasma discharge occurs within the tube between the anode and cathode in response to energization by the leads 32 to generate the lighting effect. Other plasma discharge light sources may be utilized including for example a fluorescent tube or a high intensity discharge tube.

Deflector 18 is suitably positioned within chamber 30 between focal points 22 and 24 and, specifically, is positioned forwardly of first focal point 22, and thereby of neon tube 16, and rearwardly of second focal point 24. Deflector 18 is formed of a rigid material and defines a metallic reflective surface *18a* on the side of the deflector facing the neon tube. Surface *18a* preferably has a parabolic configuration with the convexity of the parabola facing the neon tube.

The parameters of the lamp are selected such that, as seen in FIG. 1, all of the light rays 34 emitted by the tube 22 are reflected off of parabolic reflective surface *18a* and/or elliptic reflective surface 20, thereafter pass through the second focal point 24, and thereafter pass through lens 14 which functions to collimate the rays to form a beam of light emanating from the lamp.

Specifically, certain of the light rays *34a* emanating from tube 22 are reflected off of elliptic surface 20 and thereafter pass through second focal point 24 for collimation by lens 14 and other light rays *34b* emanating from the tube are reflected off of parabolic surface *18a* and thereafter off of elliptic surface 20 before passing through the second focal point 24 for collimation by the lens. This specific arrangement ensures that each light ray emitted by the neon tube is reflected off of at least one metallic reflective surface prior to passing out of the lamp. As previously noted, neon tubes tend to function as RF antennas and result in interference with other electronic on-board equipment on the vehicle but this RF interference characteristic is lessened with each strike of the light ray against a metallic surface. The described arrangement therefore has the effect of significantly reducing the RF emissions of the lamp with a consequent reduction in the interference with other electronic equipment on board the vehicle.

Figure 2:
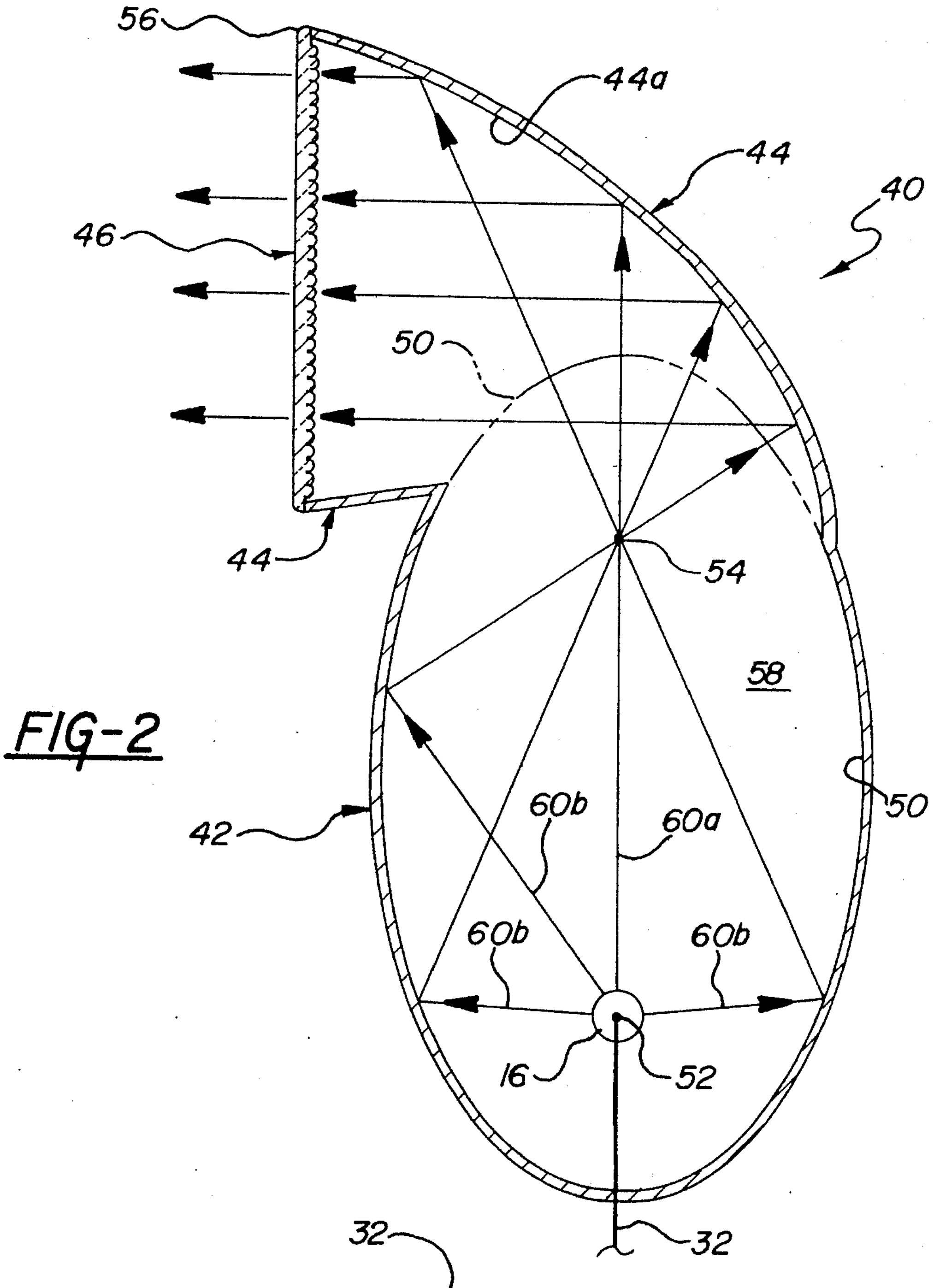
FIG. 2 is a schematic cross-sectional view of a second embodiment of the lamp according to the invention.

The lamp 40 of the embodiment of FIG. 2, broadly considered, includes a reflector housing 42, a deflector 44, a cover 46, and a neon tube 16.

Reflector housing 42 may be formed of any suitable rigid material and defines an elliptic reflective surface 50, formed of a suitable metallic material, on the inner face of the housing. Elliptic surface 50 defines a first focal point 52 and a second focal point 54 which comprise the fixed points about which the elliptic surface is generated.

Deflector 44 is formed of a suitable rigid material and is secured to the upper end of reflector housing 42. Deflector 44 defines a reflective metallic surface 44*a* on its inner or lower surface. Surface 44*a* is preferable in the form of a parabola having its focus coinciding with the second focal point 54 of elliptic surface 50.

Cover 46 is formed of any suitable rigid transparent or translucent material and is sealed in known manner to the forward annular end 56 of deflector 44 so as to coact with the deflector and with the reflector housing 42 to define a sealed chamber 58 within the lamp.

Neon tube 16 is positioned at the first focal point 52 of elliptic surface 50 and is energized by leads 32 extending through reflector housing 42 so as to provide a plasma discharge between the anode and cathode of the tube of the neon lamp in known manner.

As seen in FIG. 2, all of the light rays 60 emanating from the neon tube 48, by virtue of the elliptic configuration of surface 50, pass through the second focal point 54 of the elliptic surface whereafter they strike the parabolic surface 44*a* and are collimated by that surface so as to form a beam for projection through cover 46. All of the light rays will thus be seen to reflect off at least one reflective surface before passing out of the lamp.

Specifically, light ray 60*a* emanating centrally from tube 16 is reflected off of parabolic surface 44*a*, and light rays 60*b* emanating in an angular array from tube 16 reflect off of elliptic surface 50 and thereafter off of parabolic surface 44*a* before passing out of the lamp to form the beam. Since each light ray from the neon tube loses a portion of its troublesome RF characteristic each time it strikes a metallic surface, the described arrangement has the effect of significantly reducing the RF emissions of the lamp with a consequent reduction in the interference with other electronic equipment on board the vehicle. Note that in this case the member 46 can be a simple cover, rather than a lens as in the FIG. 1 embodiment, since the collimation in this case is performed by the parabolic surface 44*a*.

The invention will be seen to provide an arrangement whereby the desirable characteristics of neon tubes and other plasma discharge lamps may be utilized on board a motor vehicle without generating RF emissions of a magnitude sufficient to interfere with the operation of other on board electronic equipment.

Whereas preferred embodiments of the invention have been illustrated and described in detail it will be apparent that various changes may be made in the disclosed embodiments without departing from the scope or spirit of the invention.

I claim:

1. A lamp comprising:

a reflector defining a reflective surface having a focal point and a central axis passing through the focal point;

a cover coacting with the reflector to define a lamp chamber;

a plasma discharge light source positioned in the chamber at the focal point and including an elongated tube positioned transversely of the central axis and passing through the focal point; and a deflector device having a reflective surface located in the chamber between the light source and the cover in a position to intersect and redirect light rays emanating from the tube prior to passage of the light rays through the cover, the deflector operating to ensure that all light rays emanating from the tube are reflected off at least one reflective surface before passing through the cover to thereby reduce the RF characteristics of the light rays.

2. A lamp according to claim 1 wherein the reflector reflective surface has an elliptic configuration.

3. A lamp according to claim 1 wherein the deflector reflective surface has a parabolic configuration.

4. A lamp according to claim 1 wherein the elongated tube comprises a neon tube.

5. A lamp according to claim 1 wherein the lamp comprises a headlamp for a motor vehicle.

6. A lamp according to claim 1 wherein:, the reflector has an elliptic configuration defining first and second focal points; and the light source is positioned at the first focal point.

7. A lamp according to claim 6 wherein:

the deflector device presents a parabolic reflective surface; and the second focal point of the reflector constitutes the focus of the parabolic surface.

8. A lamp according to claim 6 wherein the deflector device is positioned between the first and second focal points.

9. A lamp according to claim 8 wherein the deflector device defines a reflective surface configured such that light rays reflected thereby are thereafter reflected by the elliptic reflective surface of the reflector and thereafter pass through the second focal point.

10. A lamp according to claim 9 wherein the cover comprises a lens operative to collimate the light rays after they have passed through the second focal point whereby to project a beam of light from the lamp.

11. A method of reducing the RF characteristics of a lamp having a reflector defining a reflective surface having a focal point, a cover coacting with the reflector to define a lamp chamber, and a plasma discharge light source positioned in the chamber at the focal point, characterized in that the method includes placing a deflector device having a reflective surface in the chamber between the light source and the cover in a position to intercept and redirect light rays emanating from the light source prior to passage of the light rays through the cover so that each light ray emanating from the light source strikes at least one reflective surface before passing out of the lamp chamber through the cover whereby to reduce the RF characteristics of the light rays.

12. A method according to claim 11 wherein:

the reflector reflective surface has an elliptic configuration defining first and second focal points; and the deflector device is placed in the chamber between the first and second focal points.

13. A method according to claim 11 wherein:

the reflector reflective surface has an elliptic configuration defining first and second focal points;

the light source is positioned at the first focal point; and the deflector reflective surface comprises a parabolic surface having its focus coinciding with the second focal point.

14. A lamp comprising:

a reflector defining an elliptic reflective surface defining first and second focal points;

a cover coacting with the reflector to define a lamp chamber;

a plasma discharge light source positioned in the chamber at the first focal point; and a deflector device presenting a parabolic surface having its covexity facing the first focal point and located in the chamber between the light source and the cover and between the first and second focal points in a position to intersect and redirect light rays emanating from the light source prior to passage of the light rays through the cover.

* * * * *